3,470,005
MIX FOR FORMING LIGHTWEIGHT CONCRETE
Paul Flachsenberg, Josef Wuhrer, and Walter Stein, Wülfrath, Germany, assignors to Rheinische Kalksteinwerke GmbH, Wulfrath, Germany, a corporation of Germany
Filed Sept. 10, 1965, Ser. No. 486,417
Claims priority, application Germany, Sept. 15, 1964, R 38,790
Int. Cl. C04b 21/02, 9/00
U.S. Cl. 106—87     2 Claims

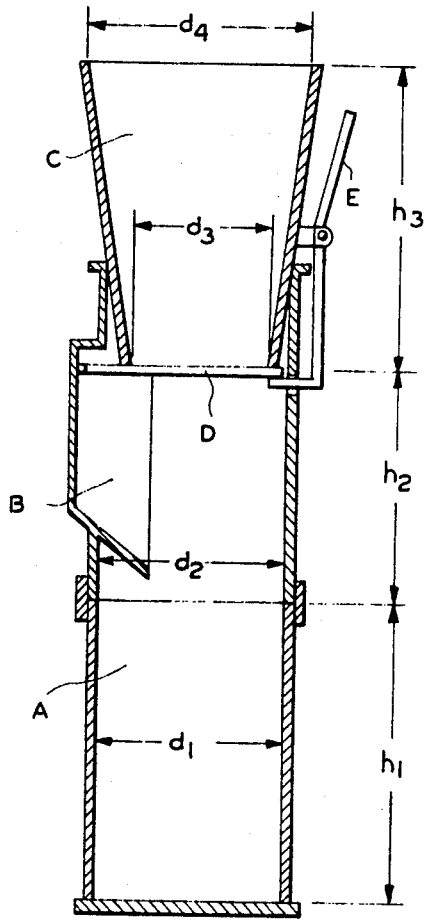

ABSTRACT OF THE DISCLOSURE

A mix for preparing porous lightweight concrete including a silica containing material and a binder with a gas producing agent wherein the binder consists of at least 78% quicklime, 90% of whose particles are smaller than $90\mu$ with a mean density in the range 1.03 to 1.15 kg./liter determined according to German specification DIN 1060.

---

This invention relates to the production of gas expanded lightweight cellular cement.

Such porous aerated products generally made by casting a mix consisting essentially of sand, lime, a gas forming reagent and water into molds and subjecting it after setting to steam-curing. The preferred gas forming agent is aluminum powder. Sometimes, cement is added.

The production steps are:
(1) Preparing the mix of sand, lime, gas forming agent and water;
(2) Pouring the mix into form;
(3) Expanding (production of pores in the cast mass by the gas forming agent and simultaneous setting);
(4) Cutting the set mass to the desired shapes, and
(5) Steam curing with saturated steam of about 13 atm. for a period of about 6–8 hours.

In this process, proper control of the expansion of the mix is of particular importance. Thereby, the lime is hydrated under development of heat, and the aluminum powder is converted in the alkaline mass, with development of hydrogen, to aluminum hydroxide. The developed hydrogen produces the pores.

In order to obtain a uniform homogeneous pore structure, which essentially determines the quality of the products, it is necessary to balance the lime and the aluminum powder with respect to each other. However, such adjustment has not been possible by varying the quality of the aluminum. It has been found that the gas development is essentially determined by the lime, more specifically by the course of the hydration and the temperature increase produced thereby.

It is, therefore, a principal object of the present invention to provide an improved composition yielding gas expanded cellular concrete articles of homogeneous porosity and improved strength.

Another object of the invention is to provide a method of making such improved gas expanded cellular concrete products.

Further objects and advantages will become apparent from a consideration of the specification and claims.

We have found that it is possible to obtain by means of alkaline gas producing agents high quality steam cured light weight building materials having uniform pore size by using a white fine lime (Weissfeinkalk) whose weight per liter, determined according to the German industry standards (DIN) 1060, is in the range of 1.03 kg./liter to 1.15 kg./liter.

Said German test standard DIN 1060 was issued July 1955 as standard for building lime. Thereby, the term "white fine lime" defines a calcined lime prepared by burning substantially pure limestone at a temperature below the sintering temperature.

Normal white fine lime according to DIN 1060 has a weight per liter below 0.90 kg./liter, generally between 0.93 and 0.97 kg./liter. It has been found that with the use of such lime it is difficult to control the cell formation and that it is not possible to obtain products of constant and uniform porosity and mechanical strength. Already during casting, and particularly during the gas development, such mixes expand violently and, due to the fast exothermic conversion of the very reactive white fine lime, reach excessive temperatures. There are produced uncontrollable gas eruptions, the mass starts bubbling, and the specifically heavier ingredients of the mix (sand and the like) settle at the bottom. Such products contain cavities and present, due to the escape of gas and sedimentation, therefore, they cannot be used and must be rejected.

In accordance with the invention, a white fine lime having a density of 1.07 to 1.09 kg./liter has proven to be particularly suitable. The white fine lime should contain at least 80 percent by weight of calcium oxide (incl. magnesium oxide). 90 percent of the unslaked lime should have a particle size of $90\mu$ or less. We prefer to use a lime 95% of which have that grain size; the best results in the production of porous light weight structures are obtained when 97 percent and more of the white fine lime have a particle size of less than $90\mu$. The white fine lime used for the purposes of this invention is readily obtained by the conventional calcination procedure. Compared with the normal white fine lime having a density of less than 0.98 kg./liter, it is a harder burnt product and can be obtained, e.g. in kilns adjusted for harder burning, from the smaller lime particles leaving such kilns.

As the density of the lime used is critical we will describe first with reference to the accompanying drawing, the apparatus and method of DIN 1060 used for determining the density.

Determination of density (DIN 1060)

The apparatus shown in the drawing comprises a cylindrical liter container A, an intermediate container B provided with a cover flap D, and a filling attachment C equipped with a spring-loaded locking lever E for holding and releasing the cover flap D. When the cover flap D is opened by actuation of the lever E, the material charged into the filling attachment falls into the liter container A. Said container A has an inner diameter $d_1$ of at least 87 and not more than 88 mm. The height $h_1$ is so adjusted that the capacity of the container is 1000 cm.³.

The intermediate container B has also an inner diameter $d_2$ of at least 87 and not more than 88 mm. Its height $h_2$ is at least 134 and at most 136 mm.

The filling attachment C has a lower inner diameter $d_3$ of at least 78 and at most 80 mm., an upper inner diameter of at least 98 and at most 100 mm., and a height $h_3$ of at least 198 and not more than 200 mm.

For testing the lime, the white fine lime is first passed through a 1.2 mm. mesh sieve in order to remove foreign matter. Lumps are crushed. Then the screened lime is dried at 105° C., and such an amount is shoveled into the filling attachment of the measuring device that the powder standing above the rim assumes its natural angle of slope. The cover flap D is then opened by manipulation of the locking lever E. After waiting two minutes, the emptied filling attachment is removed, the excess of the powdered lime is skimmed off with a ruler to ensure that the surface of the charge is flush with the rim of the container and the weight of the contents of the container is determined.

The test is repeated three times, each time with fresh lime. If the results differ by more than 10 grams, the tests are repeated twice. The mean of the three least differing values is considered the weight per liter of the lime powder.

To demonstrate the criticality of the density of the lime employed, a series of porous steam-cured lime-sand lightweight bodies of the size of about 1 m.$^3$ was prepared with lime of different densities. In each case, a mixture of 500 kg. sand having a grain size below 0.5 mm. and 140 kg. finely ground quick lime was prepared with addition of about 410 liter of water and vigorous stirring. 0.4 kg. of finely divided oiled aluminum powder, which is commercially available for this purpose, were dispersed in a small amount of water and stirred into said slurry. The thoroughly worked mixture was then at once poured into molds. After a short time, the temperature of the mass rose due to the hydration of the lime, and at the same time the aluminum started reacting with development of hydrogen. As a result of the gas development, the mass rose and slowly stiffened during the reaction. The stiffened still warm dough was then cut and steam-cured in the usual manner.

Example 1

For the first series of batches, a finely ground lime of usual quality having a weight per liter in the range of 0.93 to 0.97 kg./liter, determined according to DIN 1060, was used. The hydration of the lime proceeded very fast, and the temperature of the mix rose within 5–10 minutes to 90–95° C.

Gas was developed already during the incorporation of the aluminum powder, and the mass poured into the molds started bubbling. Gas eruption took place, and the mass, which had first risen, collapsed to a considerable extent after termination of the gas development. The cut cake showed an inhomogeneous pore structure and contained larger cavities. The density was uneven and for the most part in excess of the desired value of 0.7. The strength was insufficient, and the whole product had to be discarded.

Example 2

In another series, the same procedure was followed but by using a calcined lime whose mean density was in the range of 1.03 to 1.15 kg./liter. In this case, the temperature rose slowly to about 80° C., and after filling the mix into the molds, a uniform gas development was observed. There was no bubbling of the mass, and no gas eruption. The dough rose slowly with simultaneous steady solidification, and the pore formation was terminated with the setting of the mass. The risen cake did not collapse, and the molded bodies presented a homogeneous fine pore structure and good strength.

Example 3

The procedure of the preceding examples were repeated with a finely ground calcined lime having a weight per liter in excess of 1.2. In this batch, heat in the molds developed very slowly. The maximum temperature was too low, and the reaction of the aluminum powder for the pore formation was too slow. Though small pores were formed, the dough did not rise properly and set over a very long period of time. After cutting, it could be seen that the heavier components has settled at the bottom of the mold.

Only the upper part was porous but it had insufficient strength. Even after curing, the molded bodies could not be used for building purposes.

As will be seen from the examples, the general composition of the mix for 1 m.$^3$ gas expanded lightweight cellular cement with densities within the range of 0.3 to 1.0 kg./liter is about 150 to 650 kg. of sand or any other suitable silica containing material, 75 to 200 kg. of the binder having the specified density, 380 to 500 kg. of water, and 0.35 to 2 kg. aluminum or any other gas forming agent. The binder should contain at least 80% by weight of CaO+MgO and consist to at least 78 percent of CaO.

To the best of our knowledge, the material termed "Weissfeinkalk" in the German language corresponds essentially to the product marketed in the United States under the designation finely ground lime. (ASTM: "pulverized quick lime").

We claim:

1. A mix for use in the preparation of porous lightweight concrete consisting essentially of a silica containing material and a binder, the proportions of said materials being within the range of between about 150 and 650 kg. of said silica containing material to between about 75 and 200 kg. of said binder, said binder containing at least about 80% by weight of CaO+MgO and consisting of at least about 78% by weight of CaO in the form of pulverized quicklime having a particle size wherein at least about 90% by weight of the particles are equal to or smaller than about 90μ and having a mean density in the range of about 1.03 to 1.15 kg./liter determined according to DIN 1060 and between 0.35 to 2.0 kg. of finely divided aluminum powder.

2. A mix as claimed in claim 1 wherein the density of the quicklime is 1.07 to 1.08 kg./liter.

References Cited

UNITED STATES PATENTS

| 2,241,604 | 5/1941 | Knibbs | 106—87 |
|---|---|---|---|
| 2,741,798 | 4/1956 | Carlen | 106—87 |

FOREIGN PATENTS

| 648,407 | 1/1951 | Great Britain. |
|---|---|---|

OTHER REFERENCES

Boynton: Chemistry and Technology of Lime and Limestone, John Wiley and Sons, Inc., New York, 1966, pp. 138, 166–169.

TOBIAS E. LEVOW, Primary Examiner

WATSON T. SCOTT, Assistant Examiner

U.S. Cl. X.R.

106—118, 120